(No Model.)

H. W. HARLEY.
KNITTING MACHINE.

No. 253,530.  Patented Feb. 14, 1882.

WITNESSES:
Geo. B. Collier
Geo. T. Kelly

INVENTOR
Howard W. Harley
by Collier & Bell
attys

N. PETERS. Photo-Lithographer. Washington, D. C.

UNITED STATES PATENT OFFICE.

HOWARD W. HARLEY, OF PHILADELPHIA, PENNSYLVANIA.

KNITTING-MACHINE.

SPECIFICATION forming part of Letters Patent No. 253,530, dated February 14, 1882.

Application filed November 4, 1881. (No model.)

*To all whom it may concern:*

Be it known that I, HOWARD W. HARLEY, of the city and county of Philadelphia, and State of Pennsylvania, have invented certain new and useful Improvements in Knitting-Machines, of which improvements the following is a specification.

The object of my invention is to provide means whereby any one or more of the cams of a knitting-machine may, without stopping the frame, be so adjusted as to form either plain or tuck work, as desired, to which end my improvements consist in the combination of a cam composed of a fixed section and an adjustable section fitted to slide in a guide therein, a spring-stem connected to said adjustable section, and a locking-plate by which the stem and adjustable section are fixed in position.

The improvements claimed are hereinafter more fully set forth.

Figure 1:
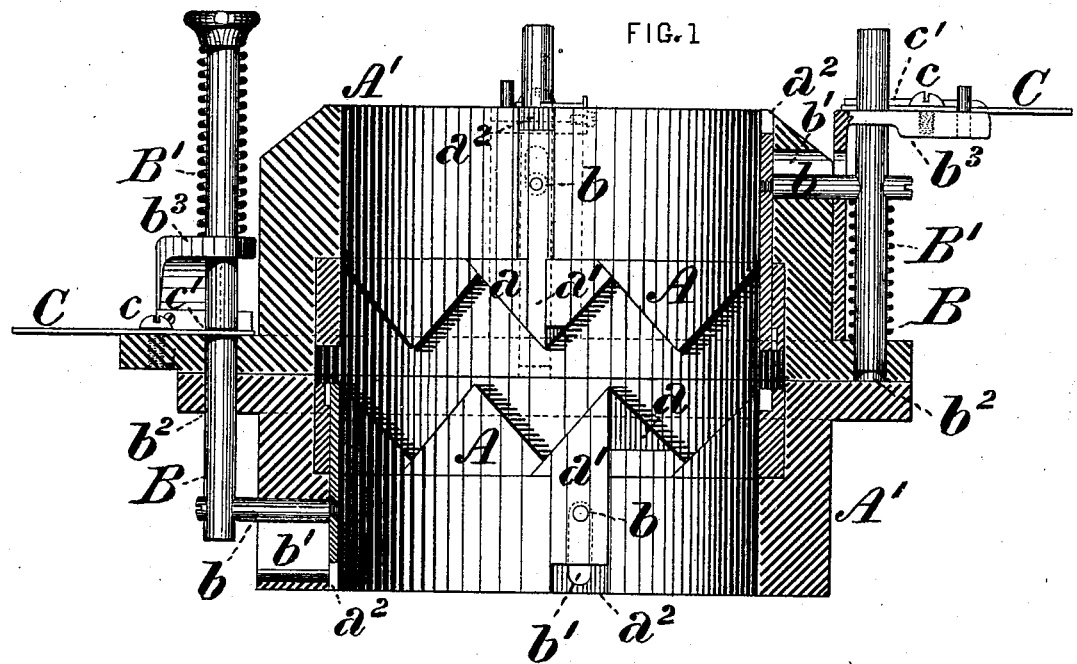
Figure 3:
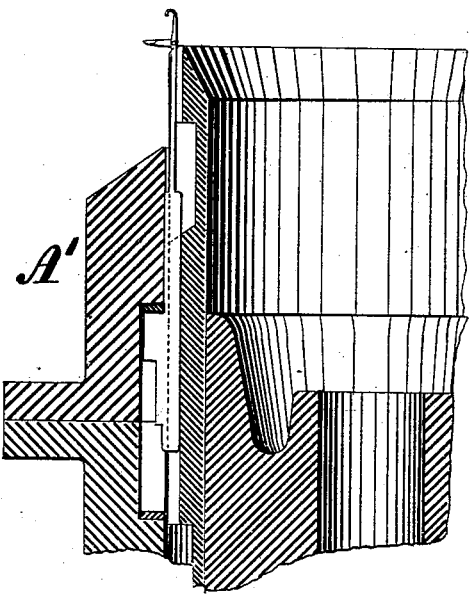
Figure 2:
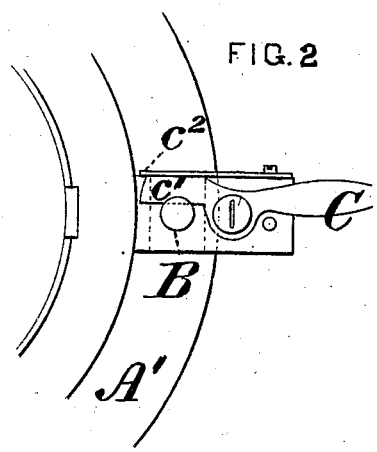

In the accompanying drawings, Figure 1 is a vertical central section through the cam-cylinder of a knitting-machine embodying my invention; Fig. 2, a plan or top view of the locking-plate; and Fig. 3, a vertical section, showing the relation of the cam and needle cylinders.

The cams A are arranged in upper and lower series upon the inner surface of the cam-cylinder A', in the usual manner, and, as shown in Fig. 1, those to which my invention is applied are formed of a fixed portion, $a$, and a movable portion, $a'$, fitted to slide vertically in a recess or guide, $a^2$, in the fixed portion. A pin or stud, $b$, secured to the movable portion of the cam, projects through a vertical slot, $b'$, in the cam-cylinder A', and is connected at its outer end to a stem, B, working in a guide, $b^2$, in a flange or flanges of the cam-cylinder, and in an upper bearing, $b^3$, secured thereto. The stem B is encircled by a helical spring, B', the tension of which is exerted at one end against one of the fixed bearings of the stem and at the other against a collar or projection thereon, so as to act to move the stem longitudinally in its bearings as far as permitted by the slot $b'$ of the cam-cylinder. The stem B and the attached section $a'$ of the cam are maintained in the position shown in Fig. 1, being that which is required for forming plain work, by a locking-plate, C, pivoted by a stud or pin, $c$, to one of the fixed bearings of the stem B, and having a projecting arm, $c'$, which enters a transverse groove or recess in the stem and holds the same in position against the tension of the spring B'. The arm $c'$ is held in the groove of the stem by a spring, $c^2$.

To adapt the cam to the formation of tuck-work the locking-plate C is swung upon its pivot so as to withdraw the arm $c'$ from the groove of the stem, when the spring B' moves the stem longitudinally in its bearings, and thereby moves the adjustable section $a'$ of the cam away from the apex of the latter, thereby presenting an open space at and adjacent to the apex of the cam, over which, instead of over the former inclined surface of the fixed portion of the cam, the notches of the needles or jacks move, thereby producing tuck-work by their failure to traverse the angular contour of the fixed portion. The stems B are raised by hand and secured by the locking-plates when plain work is to be again made.

It will be observed that my improvements are applicable to any desired number of both the top and the bottom series of cams, and that each cam is independently adjustable for either plain or tuck work without stopping the frame or interfering with the movement of the machine.

I do not broadly claim a knitting-machine cam having a fixed portion and an adjustable portion sliding thereon, such a construction being exemplified in the British Patent No. 623 of 1863.

I claim as my invention and desire to secure by Letters Patent—

The combination of a cam cylinder, a cam having a fixed portion and an adjustable portion fitted to slide thereon, bearings connected to the exterior of the cam-cylinder, a stem fitted to move longitudinally in said bearings and connected to the adjustable portion of the cam, a spring adapted to move said stem longitudinally in its bearings, and a locking-plate by which said stem is secured in position, these members being combined for joint operation substantially as and for the purpose set forth.

HOWARD W. HARLEY.

Witnesses:
  WALTER S. GIBSON,
  J. SNOWDEN BELL.